US010216489B2

(12) United States Patent
Ireland et al.

(10) Patent No.: US 10,216,489 B2
(45) Date of Patent: *Feb. 26, 2019

(54) SELECTING COBOL PERFORM STATEMENTS FOR INLINING

(71) Applicant: International Business Machines Corporation, Armonk, NY (US)

(72) Inventors: Iain A. Ireland, North York (CA); Allan H. Kielstra, Ajax (CA); Artur Kink, Richmond Hill (CA); Muntasir A. Mallick, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,907

(22) Filed: Feb. 2, 2018

(65) Prior Publication Data

US 2018/0136916 A1  May 17, 2018

Related U.S. Application Data

(63) Continuation of application No. 15/412,635, filed on Jan. 23, 2017, now Pat. No. 9,904,528, which is a
(Continued)

(51) Int. Cl.
*G06F 9/44* (2018.01)
*G06F 8/30* (2018.01)
*G06F 8/41* (2018.01)

(52) U.S. Cl.
CPC .............. *G06F 8/315* (2013.01); *G06F 8/433* (2013.01); *G06F 8/443* (2013.01); *G06F 8/4443* (2013.01)

(58) Field of Classification Search
CPC ........................................................ G06F 8/443
See application file for complete search history.

(56) References Cited

U.S. PATENT DOCUMENTS

| 7,246,331 | B2 |   | 7/2007 | Ward |
|---|---|---|---|---|
| 7,386,686 | B2 | * | 6/2008 | Wu .......................... G06F 8/443 |
|   |   |   |   | 711/147 |

(Continued)

OTHER PUBLICATIONS

Vivy Suhendra et al., Efficient Detection and Exploitation of Infeasible Paths for Software Timing Analysis, ACM, 2006, retrieved online on Jun. 18, 2018, pp. 1-6. Retrieved from the Internet: <URL: https://www.comp.nus.edu.sg/~tulika/dac06-2.pdf>. (Year: 2006).*

(Continued)

*Primary Examiner* — Hanh Thi-Minh Bui
(74) *Attorney, Agent, or Firm* — Gilbert Harmon, Jr.

(57) ABSTRACT

An approach to selecting statements for inlining in a COBOL program involving creating a PERFORM Graph (PG), determining whether the PG is a Directed Acyclic Graph (DAG), responsive to determining the PG is not a DAG, identifying a maximum sub-graph DAG corresponding to the PG, computing one or more infeasible paths associated with a Control Flow Graph (CFG), wherein the infeasible paths are induced by PERFORM range calls associated with a plurality of edges corresponding to the PG or the maximum sub-graph DAG, ordering the plurality of edges corresponding to the PG or the maximum sub-graph DAG in a list, selecting one or more edges, based on traversing the list of the plurality of edges and generating an indicator of the one or more selected edges.

1 Claim, 4 Drawing Sheets

Related U.S. Application Data continuation of application No. 15/264,936, filed on Sep. 14, 2016.

(56) References Cited

U.S. PATENT DOCUMENTS

| | | | |
|---|---|---|---|
| 7,640,536 | B1 | 12/2009 | Whalen et al. |
| 8,370,821 | B2 | 2/2013 | Haber et al. |
| 9,286,190 | B2 | 3/2016 | Bowler et al. |
| 9,483,236 | B2 | 11/2016 | Yershov et al. |
| 2005/0097528 | A1* | 5/2005 | Chakrabarti .......... G06F 8/4441 717/140 |
| 2012/0117549 | A1 | 5/2012 | Doyle et al. |
| 2013/0205281 | A1* | 8/2013 | Pizlo .................. G06F 8/443 717/128 |
| 2013/0205286 | A1* | 8/2013 | Barraclough .......... G06F 8/443 717/151 |

OTHER PUBLICATIONS

Alexandru I. Tomescu et al., Explaining a Weighted DAG with Few Paths for Solving Genome-Guided Multi-Assembly, IEEE, 2015, retrieved online on Jun. 18, 2018, pp. 1345-2015. Retrieved from the Internet: <URL: http://delivery.acm.org/10.1145/2890000/2881758/07078863.pdf?>. (Year: 2015).*

Jaffar et al., "A Path-Sensitive Control Flow Graph", National University of Singapore, Nov. 1, 2010, 10 pages.

Ireland et al, "Selecting Cobol Perform Statements for Inlining", U.S. Appl. No. 15/264,936, filed Sep. 14, 2016, 28 pages.

Ireland et al, "Selecting Cobol Perform Statements for Inlining", U.S. Appl. No. 15/412,635, filed Jan. 23, 2017, 21 pages.

Ireland et al, "Selecting Cobol Perform Statements for Inlining", U.S. Appl. No. 15/884,766, filed Jan. 31, 2018, 25 pages.

IBM Appendix P, list of patents or patent applications treated as related, filed herewith, 2 pages.

* cited by examiner

```
       ┌ PROCEDURE DIVISION.
 302 ─┤   PERFORM A
       │   PERFORM B.
       └   STOP RUN.

┌ A.
 304 ─┤   PERFORM C
       └   PERFORM D.

┌ B.
 306 ─┤   PERFORM C
       └   PERFORM D.

308 ─┤ C.
          PERFORM D.

310 ─┤ D.
          EXIT.
```

SELECTING COBOL PERFORM STATEMENTS FOR INLINING

BACKGROUND

The present invention relates generally to the field of Common Business-Oriented Language (COBOL), and more particularly to inlining.

COBOL is a computer programming language designed for business-oriented application use. COBOL utilizes an English-language based syntax with which a programmer can write program instructions. For example, PERFORM is a statement used in COBOL to indicate an action to be executed. A PERFORM range refers to the sequence of code, i.e., the subroutine, which is called by a PERFORM statement. In computer programming, inlining refers to a manual or compiler optimization technique where the body of a called function replaces the call site in a calling statement and/or function. In COBOL, PERFORM ranges can be inlined so that a called PERFORM range can replace the call site in another calling PERFORM statement, for example.

SUMMARY

As disclosed herein, a computer system for selecting statements to inline in a COBOL program, the computer system comprising: one or more computer processors; one or more computer readable storage media; program instructions stored on the one or more computer readable storage media for execution by at least one of the one or more processors, the program instructions comprising: program instructions to create, by a perform identifier, a PERFORM Graph (PG) based on a received COBOL program; program instructions to determine, by the perform identifier, whether the PG is a Directed Acyclic Graph (DAG); responsive to determining the PG is not a DAG, program instructions to identify, by the perform identifier, a maximum sub-graph DAG corresponding to the PG; program instructions to compute, by the perform identifier, one or more infeasible paths associated with a Control Flow Graph (CFG) wherein the one or more infeasible paths are induced by PERFORM range calls associated with a plurality of edges corresponding to the PG or the maximum sub-graph DAG; program instructions to order, by the perform identifier, the plurality of edges corresponding to the PG or the maximum sub-graph DAG in a list wherein the plurality of edges are ordered from a highest to a lowest number of the one or more infeasible paths induced; program instructions to select, by the perform identifier, one or more edges based on traversing the list of the plurality of edges wherein a preconfigured threshold limits selection of a maximum number of the one or more edges; program instructions to generate, by the perform identifier, an indicator of the one or more edges selected; responsive to determining the PG is a DAG or identifying the maximum sub-graph DAG, program instructions to compute, by the perform identifier, for a plurality of nodes comprising the PG or the maximum sub-graph DAG, a number of distinct paths from a root node to each of the plurality of nodes and wherein the plurality of nodes comprising the PG or the maximum sub-graph DAG correspond to PERFORM ranges comprising the COBOL program and the plurality of nodes include the root node which corresponds to a main program code sequence and wherein a number of the one or more infeasible paths associated with an edge (F,T) is computed based on the following formula: $F_{num\_paths} * (T_{num\_paths} - F_{num\_paths})$; and program instructions to send, by the perform identifier, the indicator of the one or more edges selected to a compiler for inlining the PERFORM ranges associated with the one or more edges selected.

DETAILED DESCRIPTION

Modeling the flow of PERFORM statements in a Control Flow Graph (CFG) can lead to a complex CFG with infeasible paths. A CFG is a graphical representation depicting the logical flow of executed statements (e.g., assignment statements, PERFORM statements, etc.) taken by a program. CFGs are often used for data flow analysis and compiler optimizations. Embodiments of the present invention recognize that inlining COBOL PERFORM ranges can improve a CFG by reducing the number of infeasible paths associated with the CFG. Therefore, a solution is provided herein for identifying PERFORM ranges in a COBOL program to be inlined with the use of a PERFORM Graph (PG).

A PG is a form of a directed graph which depicts the directional flow of calls to PERFORM ranges in a COBOL program. The nodes comprising a PG represent PERFORM ranges corresponding to the COBOL program. The edges in a PG, indicating a directional flow between the nodes, represent direct calls to PERFORM ranges from calling PERFORM ranges. Embodiments of the present invention provide a solution wherein an analysis of a PG corresponding to a COBOL program is performed for determining PERFORM ranges to be inlined. This is done to reduce the complexity, e.g., reduce the number of infeasible paths, involved with a CFG associated with the COBOL program.

As an example of an "infeasible path" as the term is used herein, if there are two calls to the same called PERFORM range from a first and a second calling PERFORM range, there is an apparent path (in an associated CFG) from the second calling PERFORM range through the called PERFORM range and back to the first calling PERFORM range. This apparent path, however, cannot be traversed during execution for any input given to the associated COBOL program, hence this apparent path is infeasible.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
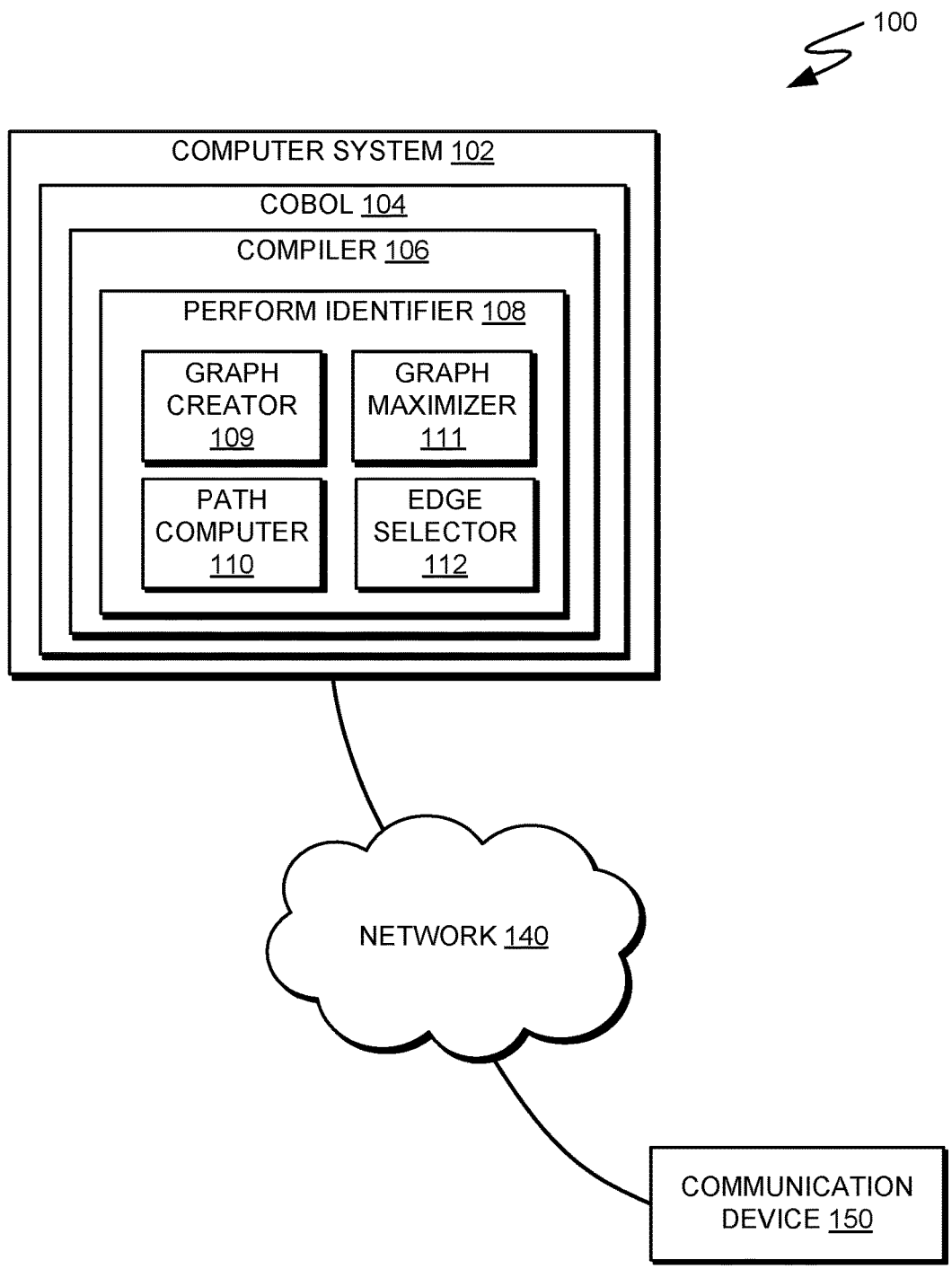
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment 100, in accordance with one embodiment of the present invention.

Distributed data processing environment 100 comprises computer system 102 and communication device 150, interconnected over network 140. Computer system 102 can be a laptop computer, tablet computer, netbook computer, personal computer (PC), a desktop computer, a personal digital assistant (PDA), a smart phone, or any programmable electronic device capable of communicating with communication device 150 via network 140. Computer system 102 comprises COBOL 104 with compiler 106 for transforming source code written in COBOL 104 into an executable program.

Figure 4:
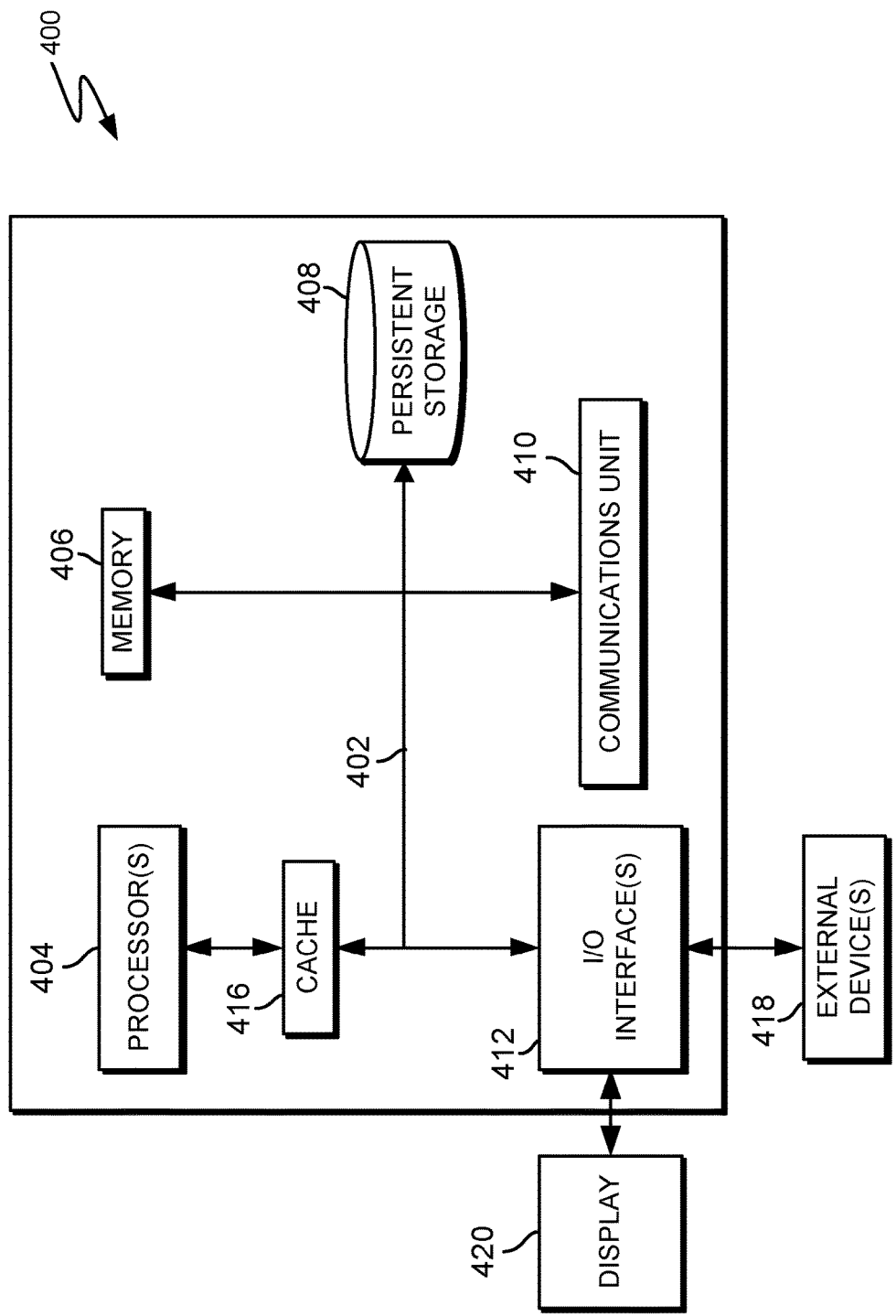
FIG. 4 is a block diagram of components of the computer system executing the PERFORM identifier, in accordance with an embodiment of the present invention.

Computer system 102 may include internal and external hardware components, as depicted and described in further detail with respect to FIG. 4.

According to one embodiment of the present invention, compiler 106 further comprises PERFORM identifier 108 which is a program for identifying PERFORM statements and/or ranges in a COBOL program to be inlined. PERFORM identifier 108 further comprises graph creator 109, path computer 110, graph maximizer 111 and edge selector 112. Graph creator 109 is a component for creating a PG corresponding to a COBOL program. Path computer 110 is a component for computing the numbers of infeasible paths that the PERFORM range calls, corresponding to edges in a PG, are responsible for inducing. Graph maximizer 111 is a component for determining whether a PG is a directed acyclic graph (DAG). If graph maximizer 111 determines that a PG is not a DAG, graph maximizer 111 can identify the maximum sub-graph corresponding to the PG that is a DAG. Edge selector 112 is a component which selects one or more edges in the PG based on the computed infeasible paths and can generate an indicator which indicates the one or more selected edges.

In various embodiments of the present invention, communication device 150 can be a laptop computer, tablet computer, netbook computer, personal computer (PC), a desktop computer, a personal digital assistant (PDA), a smart phone, or any programmable electronic device capable of communicating with computer system 102 via network 140.

Network 140 can be, for example, a local area network (LAN), a wide area network (WAN) such as the Internet, or a combination of the two, and can include wired, wireless, or fiber optic connections. In general, network 140 can be any combination of connections and protocols that will support communications between computer system 102 and communication device 150.

Figure 2:
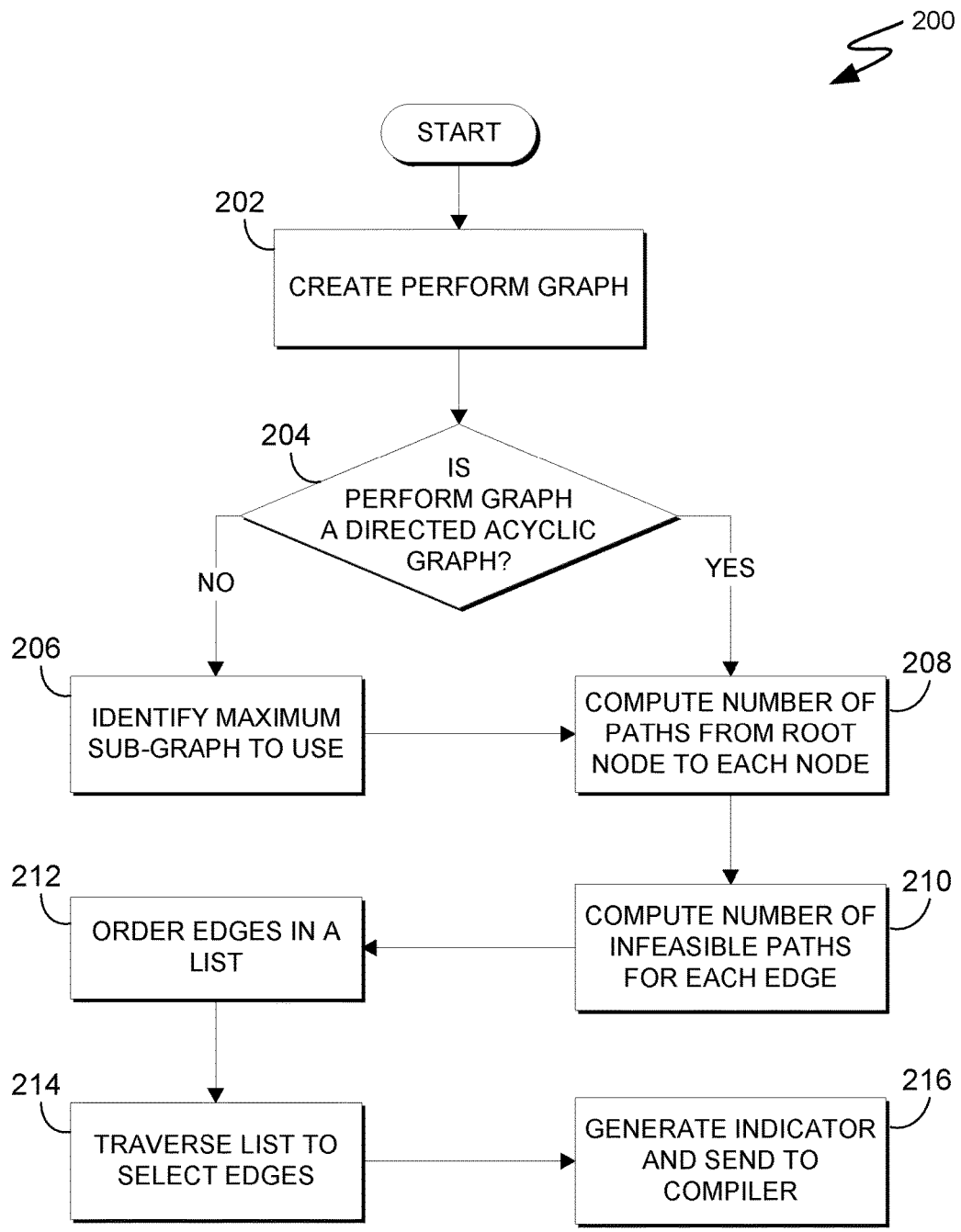
FIG. 2 is a flowchart depicting operational steps of a PERFORM identifier on a computer system within the data processing environment of FIG. 1, in accordance with an embodiment of the present invention.

FIG. 2 is a flowchart 200 depicting operational steps of PERFORM identifier 108, in accordance with an embodiment of the present invention. The illustrative example of FIG. 2 is provided to facilitate discussion of aspects of the present invention, and it should be appreciated that FIG. 2 provides only an illustration of an embodiment of the present invention and does not imply any limitations with regard to the variations or configurations in which different embodiments may be implemented.

Graph creator 109 creates a PG associated with a program in COBOL 104 (step 202). The PG is a directed graph comprising a plurality of nodes corresponding to PERFORM ranges in the COBOL program. Graph creator 109 creates a root node in the PG which represents the main program where execution begins. The PG further comprises edges which illustrate the logical directional flow of the nodes (corresponding to the PERFORM ranges) as the COBOL program is being executed. An example of a PG created by graph creator 109, according to one embodiment of the present invention, will be depicted and described in further detail with respect to FIG. 3B.

Graph maximizer 111 determines if the PG is a DAG (decision block 204). A DAG as the term is used herein refers to a directed graph having a topological ordering with no directed cycles, i.e., there are no sequences of directed edges starting from a node N that cycle back to node N. Graph maximizer 111 can determine if the PG is a DAG using known algorithms, e.g., Tarjan's strongly connected components algorithm, or other techniques apparent to one of ordinary skill in the art. Responsive to determining that the PG is not a DAG (step 204, NO branch), graph maximizer 111 identifies a maximum sub-graph (comprising the PG) which is a DAG (step 206). For example, graph maximizer 111 can use an algorithm apparent to one of ordinary skill in the art to identify a maximum sub-graph DAG.

Responsive to a determination that the PG is a DAG (step 204, YES branch) or an identification of the maximum sub-graph DAG, path computer 110 computes a number of distinct paths from the root node to each node comprising the PG (step 208). For a given node N, the number of distinct paths leading from the root node to node N is denoted herein as $N_{num\_paths}$. This parameter represents the number of distinct paths in the PG or maximum sub-graph DAG, e.g., paths through other nodes, that the program takes to get to node N from the root node, representing the main program code sequence. The distinct paths through the PG or maximum sub-graph DAG represent paths of PERFORM range calls leading to an eventual call of the PERFORM range representing the given node N.

Path computer 110 computes the number of infeasible paths, associated with a CFG corresponding to the COBOL program, that each edge comprising the PG or maximum sub-graph DAG is inducing (step 210). In this context, edges depict a directed logical flow between adjacent nodes, representing a direct call from one PERFORM range to another. The number of distinct paths for a given node N, i.e., $N_{num\_paths}$, may comprise one or more edges of the PG or maximum sub-graph DAG, for example. For a given edge (F,T) in the PG or maximum sub-graph DAG (representing an edge starting at a node F and ending at a node T), the following formula is used by path computer 110 to compute the number of infeasible paths the edge is inducing:

$$F_{num\_paths} * (T_{num\_paths} - F_{num\_paths})$$

The value resulting from this formula for a given edge (F,T) is an approximate number of infeasible paths (associated with the CFG) which the edge (F,T) is responsible for inducing. Path computer 110 computes a value with this formula for each edge comprising the PG or maximum sub-graph DAG. In other embodiments of the present invention, other formulas and/or algorithms apparent to one of ordinary skill in the art can be used to compute a number of infeasible paths that an edge is inducing in a CFG.

Edge selector 112, using the values computed by path computer 110, orders the edges associated with the PG or maximum sub-graph DAG in a list (step 212). For example, edge selector 112 orders the edges from the highest to lowest numbers of infeasible paths that the edges are inducing. Edge selector 112 traverses the ordered list of edges associated with the PG or maximum sub-graph DAG to select edges to be inlined (step 214). In the embodiment where edges are ordered from the highest to lowest numbers of infeasible paths, edge selector 112 traverses the ordered list from top to bottom. The highest edge in the list represents a PERFORM range call inducing a greatest number of infeasible paths associated with the CFG, therefore edge selector 112 can select the highest edge for inlining a PERFORM range associated with the highest edge. Edge selector 112 can continue to traverse the list for selecting edges up to a preconfigured limit.

Edge selector 112 can have a preconfigured "budget" representing a maximum number of edges that can be selected for PERFORM range inlining. For example, once edge selector 112 has selected the maximum number of edges prescribed by the budget, edge selector 112 can discontinue traversing the ordered list of edges. Additionally or alternatively, edge selector 112 can be preconfigured to only select edges exceeding a minimum threshold number of infeasible edges they are responsible for inducing.

Edge selector 112 generates an indicator associated with the selected edges and sends the indicator to compiler 106 (step 216). The indicator provides an indication of which PERFORM ranges and/or statements, associated with the selected edges, can be inlined in the COBOL program. For example, inlining a PERFORM range associated with a selected edge can comprise replacing, in a first PERFORM range, a call to a second PERFORM range with the body of the second PERFORM range. This PERFORM range inlining removes edges in the CFG, thereby reducing the number of infeasible paths (and therefore, the complexity) associated with the CFG corresponding to the COBOL program.

Figures 3A, 3B:
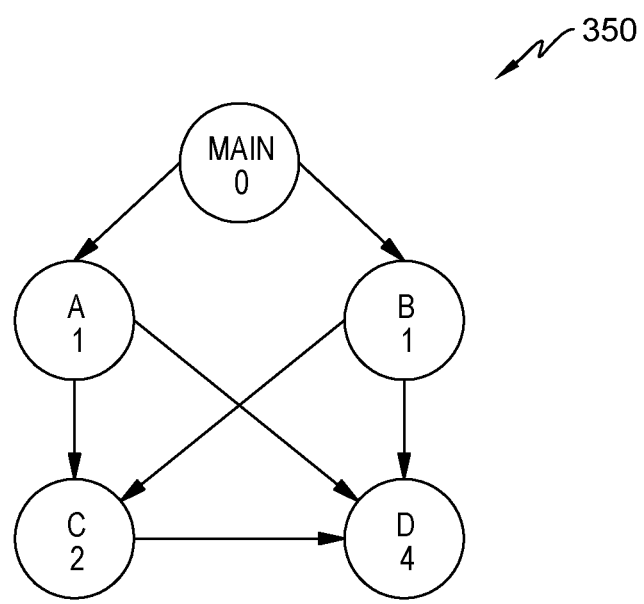
FIGS. 3A-B depict an example segment of a COBOL program and a PERFORM graph corresponding to the example segment of a COBOL program, respectively, in accordance with an embodiment of the present invention.

FIG. 3A depicts a segment 300 of an example COBOL program, in accordance with an embodiment of the present invention. Statements such as "PERFORM A" and "PERFORM B" in main program 302 are examples of PERFORM statements. As an example of a PERFORM range call, "PERFORM A" represents a call to PERFORM range 304, comprising "PERFORM C" and "PERFORM D." PERFORM range 306 comprises "PERFORM C" and "PERFORM D", PERFORM range 308 comprises "PERFORM D" and PERFORM range 310 comprises "EXIT."

FIG. 3B is an illustration of an example PG 350 corresponding to the segment of the example COBOL program depicted in FIG. 3A, in accordance with an embodiment of the present invention. PG 350 is a DAG comprising nodes MAIN, A, B, C and D, and edges indicated by arrows between the nodes. MAIN, i.e., the root node, corresponds to main program 302 associated with the COBOL program of FIG. 3A and nodes A-D represent PERFORM ranges comprising the COBOL program. The edges represent direct calls to the PERFORM ranges corresponding to nodes A-D. The numbers on the nodes in PG 350 correspond to the value $N_{num\_paths}$ associated with each node, computed by path computer 110.

For example, in PG 350 there are four distinct paths from MAIN to node D. The four distinct paths from MAIN to node D through a sequence of edges are as follows: {MAIN, A, D}; {MAIN, A, C, D}; {MAIN, B, D} and {MAIN, B, C, D}. The number of infeasible paths induced by an edge (in an associated CFG) is computed by path computer 110 for each edge in PG 350, as previously described. Using the formula $F_{num\_paths} * (T_{num\_paths} - F_{num\_paths})$, the number of infeasible paths for each edge in PG 350 are as follows: (MAIN,A):0, (MAIN,B):0, (A,D):3, (A,C):1, (B,C):1, (B,D):3, (C,D):4.

In a list of edges associated with PG 350, ordered from the highest to lowest numbers of infeasible paths induced, edge (C,D) would appear at the top. Therefore, edge (C,D) would be the first edge selected by edge selector 112. Edge selector 112 can continue to traverse the ordered list, selecting other edges for PERFORM range inlining up to a preconfigured threshold limit. When edge selector 112 has completed selecting edges, an indicator indicating the selected edges, e.g., edge (C,D), is generated and sent to compiler 106 for inlining associated PERFORM ranges and/or statements.

FIG. 4 depicts a block diagram 400 of components of computer system 102 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 102 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

PERFORM identifier 108 can be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 can provide communications through the use of either or both physical and wireless communications links. PERFORM identifier 108 can be downloaded to persistent storage 408 through communications unit 410.

I/O interface(s) 412 allows for input and output of data with other devices that can be connected to computer system 102. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., PERFORM identifier 108, can be stored on such portable computer readable storage media and can be loaded onto persistent storage 408 via I/O interface(s) 412. I/O interface(s) 412 also connect to a display 420. Display 420 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for selecting statements to inline in a COBOL program, the computer system comprising:
   one or more computer processors;
   one or more computer readable storage media;
   program instructions stored on the one or more computer readable storage media for execution by at least one of the one or more processors, the program instructions comprising:
      program instructions to create, by a perform identifier, a PERFORM Graph (PG) based on a received COBOL program;
      program instructions to determine, by the perform identifier, whether the PG is a Directed Acyclic Graph (DAG);
      responsive to determining the PG is not a DAG, program instructions to identify, by the perform identifier, a maximum sub-graph DAG corresponding to the PG;
      program instructions to compute, by the perform identifier, one or more infeasible paths associated with a Control Flow Graph (CFG) wherein the one or more infeasible paths are induced by PERFORM range calls associated with a plurality of edges corresponding to the PG or the maximum sub-graph DAG;
      program instructions to order, by the perform identifier, the plurality of edges corresponding to the PG or the maximum sub-graph DAG in a list wherein the plurality of edges are ordered from a highest to a lowest number of the one or more infeasible paths induced;
      program instructions to select, by the perform identifier, one or more edges based on traversing the list of the plurality of edges wherein a preconfigured threshold limits selection of a maximum number of the one or more edges;
      program instructions to generate, by the perform identifier, an indicator of the one or more edges selected;
      responsive to determining the PG is a DAG or identifying the maximum sub-graph DAG, program instructions to compute, by the perform identifier, for a plurality of nodes comprising the PG or the maximum sub-graph DAG, a number of distinct paths from a root node to each of the plurality of nodes and wherein the plurality of nodes comprising the PG or the maximum sub-graph DAG correspond to PERFORM ranges comprising the COBOL program and the plurality of nodes include the root node which corresponds to a main program code sequence and wherein a number of the one or more infeasible paths associated with an edge (F,T) is computed based on the following formula: $F_{num\_paths} * (T_{num\_paths} - F_{num\_paths})$; and
      program instructions to send, by the perform identifier, the indicator of the one or more edges selected to a compiler for inlining the PERFORM ranges associated with the one or more edges selected.

* * * * *